(12) United States Patent
Moga et al.

(10) Patent No.: US 10,060,264 B2
(45) Date of Patent: Aug. 28, 2018

(54) GAS TURBINE ENGINE AND COOLED FLOWPATH COMPONENT THEREFOR

(75) Inventors: Corina Moga, Carmel, IN (US); Jerry Layne, Greenwood, IN (US); Jeffrey F. Rhodes, Zionsville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 963 days.

(21) Appl. No.: 13/337,103

(22) Filed: Dec. 24, 2011

(65) Prior Publication Data

US 2012/0201653 A1  Aug. 9, 2012

Related U.S. Application Data

(60) Provisional application No. 61/428,728, filed on Dec. 30, 2010.

(51) Int. Cl.
*F01D 5/18* (2006.01)
*F01D 5/14* (2006.01)

(52) U.S. Cl.
CPC .......... *F01D 5/147* (2013.01); *F01D 5/187* (2013.01); *F05D 2240/122* (2013.01); *F05D 2240/304* (2013.01); *F05D 2260/202* (2013.01); *F05D 2260/22141* (2013.01); *Y02T 50/673* (2013.01); *Y02T 50/676* (2013.01)

(58) Field of Classification Search
CPC ............. F01D 5/18; F01D 5/188; F01D 5/189
USPC ............. 415/115, 166, 178; 416/90 R, 96 A, 416/97 R, 226
See application file for complete search history.

(56) References Cited

U.S. PATENT DOCUMENTS

| 2,644,665 | A | * | 7/1953 | Cangemi | 416/90 R |
| 3,402,914 | A | * | 9/1968 | Kump et al. | 416/231 R |
| 3,644,059 | A |   | 2/1972 | Bryan |  |

(Continued)

FOREIGN PATENT DOCUMENTS

| EP | 0641917 A1 | 3/1995 |
| EP | 1 116 861 | 7/2001 |

(Continued)

OTHER PUBLICATIONS

International Search Report and Written Opinion, PCT/US2011/067395, Rolls-Royce North American Technologies Inc., dated Apr. 17, 2012.

(Continued)

*Primary Examiner* — Kenneth Bomberg
*Assistant Examiner* — Brian Delrue
(74) *Attorney, Agent, or Firm* — Barnes & Thornburg LLP

(57) ABSTRACT

Apparatus and systems for a cooled gas turbine engine flowpath component are disclosed. In some embodiments, the flowpath component includes a spar and a coversheet. The spar may include a suction-side wall extending from a leading edge to a trailing edge and a pressure-side wall extending from the leading edge to the trailing edge, each wall having an outer surface. The coversheet may be positioned on the spar to at least partially enclose the spar, the coversheet having an engagement surface positioned to face the outer surface of the suction-side wall and the outer surface of the pressure-side wall. The spar and the coversheet cooperate to form a number of passageways configured to cool the flowpath component.

21 Claims, 4 Drawing Sheets

(56) References Cited

U.S. PATENT DOCUMENTS

| | | | | |
|---|---|---|---|---|
| 3,644,060 | A * | 2/1972 | Bryan | 416/97 R |
| 3,806,276 | A * | 4/1974 | Aspinwall | 416/97 R |
| 3,819,295 | A * | 6/1974 | Hauser et al. | 416/97 R |
| 4,042,162 | A * | 8/1977 | Meginnis et al. | 228/106 |
| 4,056,332 | A * | 11/1977 | Meloni | 416/97 A |
| 4,407,632 | A * | 10/1983 | Liang | 416/97 R |
| 4,501,053 | A * | 2/1985 | Craig et al. | 29/889.721 |
| 4,583,914 | A * | 4/1986 | Craig et al. | 416/204 A |
| 4,650,399 | A * | 3/1987 | Craig et al. | 416/97 R |
| 4,752,186 | A * | 6/1988 | Liang | 416/97 R |
| 5,263,820 | A * | 11/1993 | Tubbs | 416/97 R |
| 5,328,331 | A * | 7/1994 | Bunker et al. | 416/96 R |
| 5,370,499 | A * | 12/1994 | Lee | F01D 5/186 |
| | | | | 416/97 A |
| 5,486,093 | A | 1/1996 | Auxier et al. | |
| 5,690,472 | A * | 11/1997 | Lee | F01D 5/187 |
| | | | | 416/95 |
| 6,003,754 | A | 12/1999 | Rhodes | |
| 6,220,817 | B1 | 4/2001 | Durgin et al. | |
| 6,254,334 | B1 * | 7/2001 | LaFleur | F01D 5/186 |
| | | | | 415/115 |
| 6,439,846 | B1 * | 8/2002 | Anderson et al. | 416/96 R |
| 6,514,042 | B2 * | 2/2003 | Kvasnak | F01D 5/187 |
| | | | | 415/115 |
| 6,582,186 | B2 * | 6/2003 | Manzoori et al. | 416/96 A |
| 6,582,194 | B1 * | 6/2003 | Birkner et al. | 416/97 R |
| 6,709,230 | B2 * | 3/2004 | Morrison et al. | 415/115 |
| 6,974,308 | B2 | 12/2005 | Halfmann et al. | |
| 7,021,896 | B2 * | 4/2006 | Dodd | 416/97 R |
| 7,131,818 | B2 | 11/2006 | Cunha et al. | |
| 7,247,002 | B2 * | 7/2007 | Albrecht et al. | 416/224 |
| 7,300,251 | B2 * | 11/2007 | Kitamura et al. | 416/97 R |
| 7,438,528 | B2 * | 10/2008 | Goodman et al. | 416/97 R |
| 7,527,470 | B2 * | 5/2009 | Guimbard et al. | 415/115 |
| 7,674,092 | B2 * | 3/2010 | Annerfeldt | F01D 5/187 |
| | | | | 416/97 R |
| 7,695,245 | B1 | 4/2010 | Liang | |
| 7,744,348 | B2 | 6/2010 | Bezencon et al. | |
| 7,824,150 | B1 * | 11/2010 | Kimmel et al. | 415/115 |
| 7,828,515 | B1 | 11/2010 | Kimmel | |
| 2002/0182056 | A1 | 12/2002 | Widrig et al. | |
| 2005/0249583 | A1 | 11/2005 | Mongillo et al. | |
| 2006/0120869 | A1 | 6/2006 | Wilson et al. | |
| 2008/0298975 | A1 | 12/2008 | James et al. | |
| 2010/0034638 | A1 * | 2/2010 | Chambers et al. | 415/115 |
| 2010/0221123 | A1 * | 9/2010 | Pal et al. | 416/97 R |

FOREIGN PATENT DOCUMENTS

| | | |
|---|---|---|
| EP | 1548230 A2 | 6/2005 |
| EP | 1586738 A2 | 10/2005 |
| EP | 1 607 575 | 12/2005 |
| EP | 1790821 A1 | 5/2007 |
| JP | H07305603 | 11/1995 |
| WO | 00/03124 A2 | 1/2000 |

OTHER PUBLICATIONS

Supplemental European Search Report and Written Opinion, European Patent Application No. 11854338.8-1610/2659095, PCT/US2011/067395, search completed Aug. 28, 2015, 7 pages.

Extended European Search Report, issued in connection with European Patent Application No. 11854338.8-1610/2659095 PCT/US2011/067395, dated Jan. 7, 2016, 11 pages.

Japanese Office Action, Japanese Patent Appln No. 2013-547614, dated Dec. 25, 2015, 4 pages.

Extended EP Search Report completed dated Feb. 5, 2018 and issued in connection with European Patent Application No. 17203135.3.

Canada Office Action issued in connection with Canadian Application No. 2821178, dated Sep. 29, 2017, 4 pages.

* cited by examiner

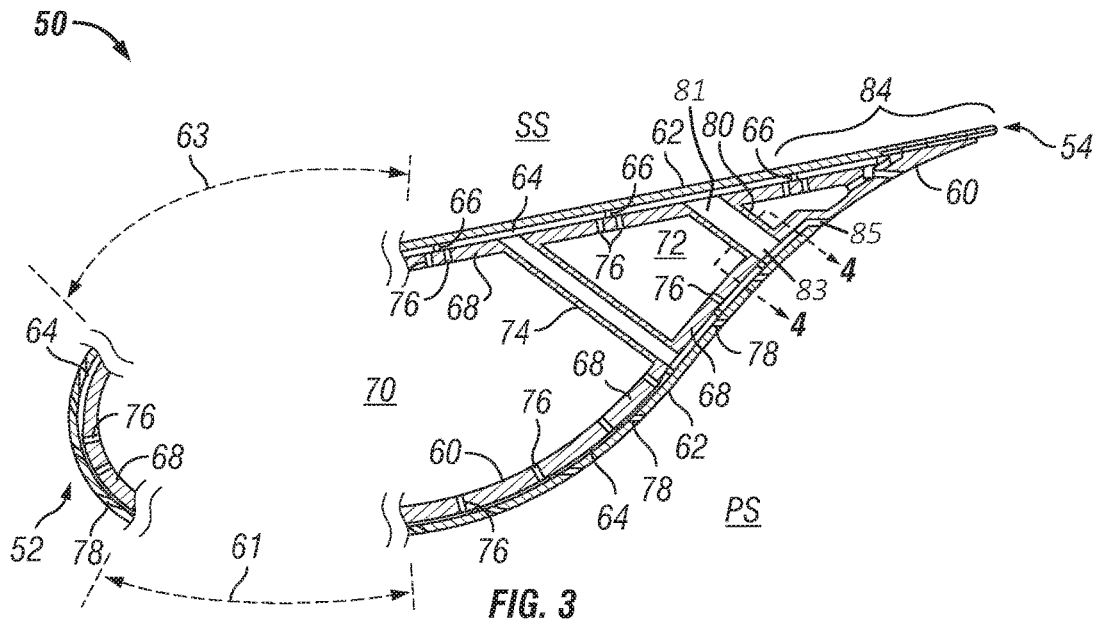
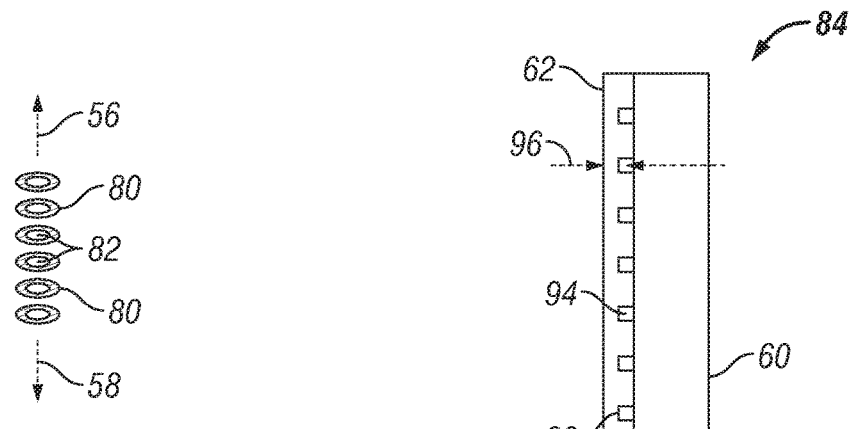
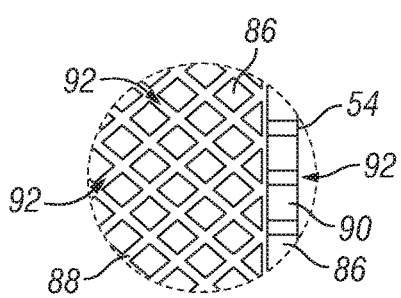
FIG. 3
FIG. 4
FIG. 5B
FIG. 5A

GAS TURBINE ENGINE AND COOLED FLOWPATH COMPONENT THEREFOR

CROSS REFERENCE TO RELATED APPLICATIONS

The present application claims benefit of U.S. Provisional Patent Application No. 61/428,728, filed Dec. 30, 2010, entitled Gas Turbine Engine And Cooled Flowpath Component Therefor, which is incorporated herein by reference.

GOVERNMENT RIGHTS

The present application was made with the United States government support under Contract No. FA 8650-07-C-2803, awarded by the U.S. Air Force. The United States government may have certain rights in the present application.

FIELD OF THE INVENTION

The present invention relates to gas turbine engines, and more particularly, to gas turbine engines with cooled flowpath components.

BACKGROUND

Cooled gas turbine engine flowpath components that effectively use a cooling fluid, such as cooling air, remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment of the present invention is a unique cooled gas turbine engine flowpath component. Other embodiments include apparatuses, systems, devices, hardware, methods, and combinations for gas turbine engines and cooled gas turbine engine flowpath components. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 3 illustrates some aspects of a non-limiting example of the flowpath component of FIG. 2 in accordance with an embodiment of the present invention.

FIG. 4 illustrates some aspects of a non-limiting example of a plurality of pins configured to transmit cooling air across the flowpath component of FIG. 2.

FIGS. 5A and 5B illustrate some aspects of a non-limiting example of a trailing edge portion of the flowpath component of FIG. 2.

DETAILED DESCRIPTION

Figure 1:
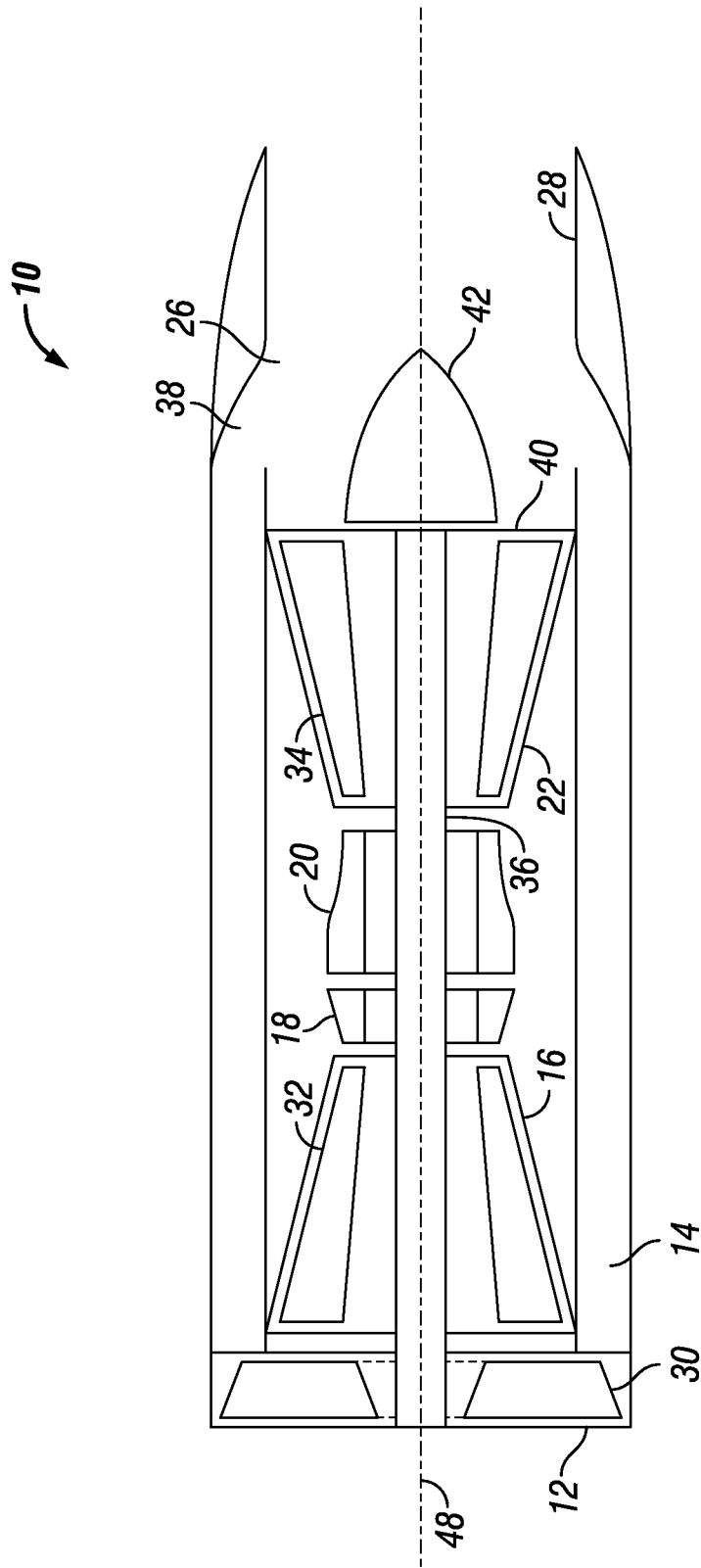
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a gas turbine engine 10 in accordance with an embodiment of the present invention is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor system 16, a diffuser 18, a combustion system 20, a turbine system 22, a discharge duct 26 and a nozzle system 28. Bypass duct 14 and compressor system 16 are in fluid communication with fan system 12. Diffuser 18 is in fluid communication with compressor system 16. Combustion system 20 is fluidly disposed between compressor system 16 and turbine system 22. In one form, combustion system 20 includes a combustion liner (not shown) that contains a continuous combustion process. In other embodiments, combustion system 20 may take other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine system 22. Bypass duct 14 is operative to transmit a bypass flow generated by fan system 12 to nozzle 28. Compressor system 16 includes a compressor rotor system 32. In various embodiments, compressor rotor system 32 includes one or more rotors (not shown) that are powered by turbine system 22. Each compressor rotor includes a plurality of rows compressor blades (not shown) that are alternatingly interspersed with rows of compressor vanes (not shown). Turbine system 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) that are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine system 22 is operative to discharge an engine 10 core flow to nozzle 28.

In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48.

Discharge duct 26 extends between a bypass duct discharge portion 38, a discharge portion 40 of turbine system 22 and engine nozzle 28. Discharge duct 26 is operative to direct bypass flow and core flow from bypass duct discharge portion 38 and turbine discharge portion 40, respectively, into nozzle system 28. In some embodiments, discharge duct 26 may be considered a part of nozzle 28. Nozzle 28 in fluid communication with fan system 12 and turbine system 22. Nozzle 28 is operative to receive the bypass flow from fan system 12 via bypass duct 14, and to receive the core flow from turbine system 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor system 16 as core flow, and some of the pressurized air is directed into bypass duct 14 as bypass flow, which is discharged into nozzle 28 via discharge duct 26. Compressor system 16 further pressurizes the portion of the air received therein from fan 12, which is then discharged into diffuser 18. Diffuser 18 reduces the velocity of the pressurized air, and directs the diffused core airflow into combustion system 20. Fuel is mixed with the pressurized air in combustion system 20, which is then combusted. The hot gases exiting combustion system 20 are directed into turbine system 22, which extracts energy in the form of mechanical shaft power sufficient to drive fan system 12 and compressor system 16 via shafting system 36. The core flow exiting turbine system 22 is directed along an engine tail cone 42 and into discharge duct 26, along with the bypass flow from bypass duct 14. Discharge duct 26 is configured to receive the bypass flow and the core flow, and to discharge both into nozzle 28 as an engine exhaust flow, e.g., for providing thrust, such as for aircraft propulsion.

Compressor rotor system 32 includes a plurality of blades and vanes (not shown) employed to add energy to the gases prior to combustion. Turbine rotor system 34 includes a plurality of blades and vanes (not shown) employed to extract energy from the high temperature high pressure gases in the flowpath. It is desirable to maintain the temperature of blades and vanes within certain temperature limits, e.g., based on the materials and coatings employed in the blades and vanes. In many cases, blades and vanes are cooled by injecting cooling air into the blade or vane.

Figure 2:
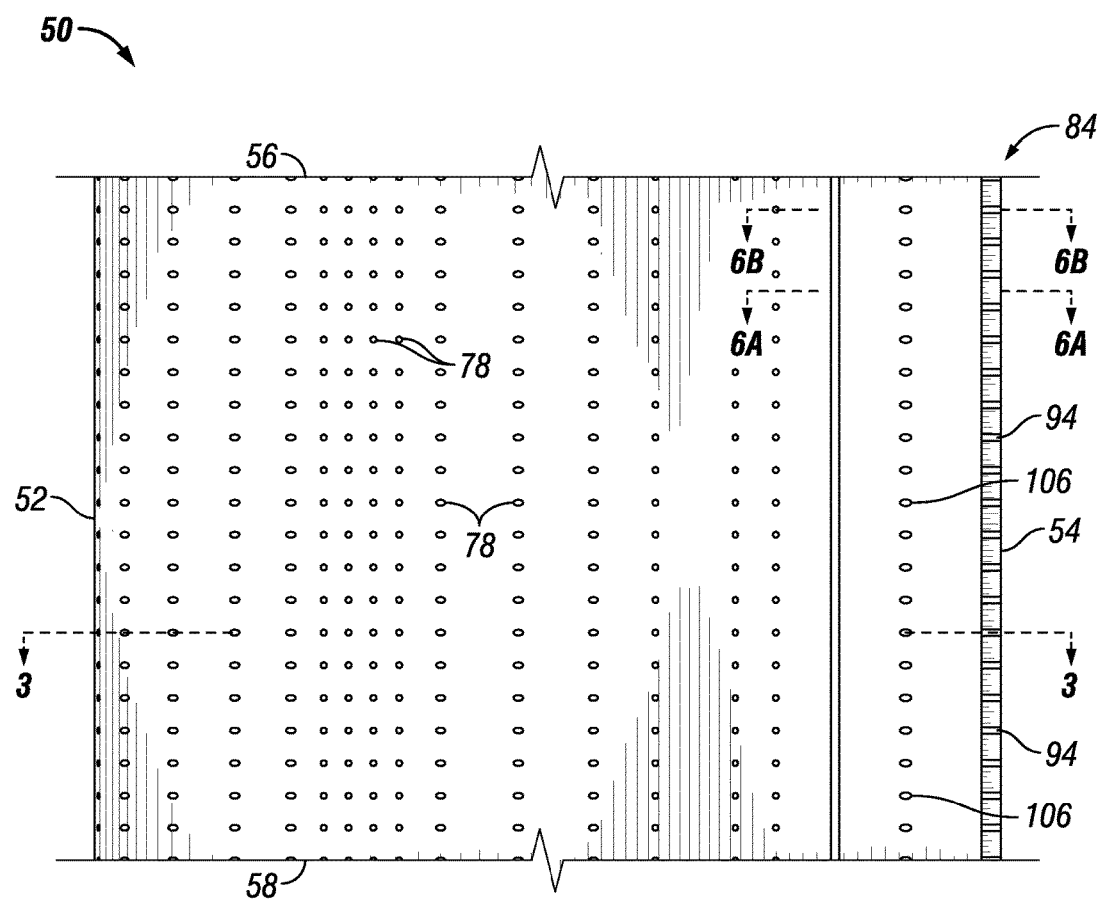
FIG. 2 illustrates some aspects of a non-limiting example of a flowpath component in accordance with an embodiment of the present invention.

Referring to FIG. 2, some aspects of a non-limiting example of a cooled flowpath component 50 in accordance with an embodiment of the present invention is illustrated. As used herein, a "flowpath component" is a component of engine 10 that is at least partially disposed within or exposed to core gas flow in engine 10 and/or forms at least in part the flowpath boundary in engine 10 that contains the core gas flow. In one form, flowpath component 50 is a turbine flowpath component. In a particular form, flowpath component 50 is a turbine vane airfoil, referred to herein as airfoil 50. In other forms, flowpath component 50 may take other forms, and may be, for example and without limitation, a turbine blade, a strut, a blade platform or shroud, or may be a compressor or other flowpath component. In one form, airfoil 50 includes a leading edge 52, a trailing edge 54, a tip 56 and a hub 58.

Referring to FIG. 3, airfoil 50 is defined by a pressure side PS and a suction side SS. Airfoil 50 includes a spar 60 and a coversheet 62. Coversheet 62 is configured for mating engagement with spar 60. In one form, coversheet 62 is diffusion bonded to spar 60 on both pressure side PS and suction side SS. In other embodiments, coversheet 62 may be affixed to spar 60 using other bonding techniques and/or other joining methods, e.g., including welding, brazing or other material joining methods. In one form, coversheet 62 is configured to almost fully enclose spar 60, leaving a portion of spar 60 uncovered on pressure side PS adjacent trailing edge 54. In other embodiments, coversheet 62 may be configured to completely cover spar 60, or may be configured to partially cover spar 60 to a greater or lesser extent than that illustrated in FIG. 3.

Spar 60 and coversheet 62 are configured to form a gap 64 between spar 60 and coversheet 62 via the use of ribs 66 and other standoff devices 66 (sometimes called spacers 66), e.g., formed in spar 60 and coversheet 62. For example, a plurality of spacers 66 are positioned between spar 60 and coversheet 62 in the suction-side of gap 64 and in the pressure-side of gap 64 as shown in FIG. 3. Spar 60 includes a perimetrical wall 68 that extends around the perimeter of spar 60 and defines a leading edge cooling air supply cavity 70 and a trailing edge cooling air supply cavity 72 separated by a continuous rib 74 that extends between tip 56 and hub 58. A plurality of apertures 76 in spar 60 extend through wall 68. Apertures 76 are configured to deliver cooling air from cooling air supply cavities 70 and 72 into gap 64. Gap 64 is operative as a distribution annulus to deliver cooling air about the outer periphery of spar 60 and about the inner periphery of coversheet 62. Coversheet 62 includes a plurality of openings 78 spaced apart about the periphery of coversheet 62 for providing film cooling of coversheet 62. Although a portion of the pressure side PS and suction side SS are not illustrated in FIG. 3, it will be understood that spar 60, coversheet 62, gap 64 and perimetrical wall 68 extend continuously, e.g., at a desired aerodynamic profile, between leading edge 52 and the illustrated portion of pressure side PS, bridging the gap 61 illustrated in FIG. 3; and that spar 60, coversheet 62, gap 64 and perimetrical wall 68 extend continuously, e.g., at a desired aerodynamic profile, between leading edge 52 and the illustrated portion of suction side SS, bridging the gap 63 illustrated in FIG. 3, thereby closing off the periphery of leading edge cooling air supply cavity 70.

Referring to FIG. 4 in conjunction with FIG. 3, disposed in the trailing edge portion of airfoil 50 are a plurality of hollow pins 80. Hollow pins 80 are illustrated in cross-section in FIG. 4, with spar 60 and coversheet 62 removed for clarity. Pins 80 are oval in cross-sectional shape. As used herein, "oval" includes both elliptical shapes, and "racetrack" shapes, e.g., in the form of a rectangle with rounded corners. Pins 80 bridge cooling air supply cavity 72, extending between pressure side PS of spar 60 and suction side SS of spar 60. Pins 80 are configured to transmit cooling air directly, i.e., in a straight line, from gap 64 on suction side SS to gap 64 on pressure side PS via oval openings 82 extending through pins 80, which are in fluid communication with gap 64 on both suction side SS and pressure side PS. Pins 80 are spaced apart in the direction from tip 56 to hub 58 by a sufficient amount to allow the flow of cooling air in cooling air supply cavity 72 to flow in sufficient quantity between pins 80 in the direction of trailing edge 54 to provide a desired amount of cooling air for cooling airfoil 50 in the vicinity of trailing edge 54. Pins 80 are oval in shape in order to maximize the area of openings 82 for transmitting cooling air, while also maximizing the flow area between pins 80 to accommodate the flow therethrough for cooling airfoil 50 in the vicinity of trailing edge 54. In other embodiments, pins 80 may have other shapes. Hollow pins 80 extend between first openings 81 formed in an outer surface of the suction-side of wall 68 of spar 60 and second openings 83 formed in the outer surface of the pressure-side of wall 68 of spar 60 as shown in FIG. 3. Hollow pins 80 provide fluid communication between the suction-side of gap 64 and the pressure-side of gap 64. Coversheet 62 defines at least a portion of a third opening 85 that is located on the pressure side of the turbine flowpath component as shown in FIG. 3. Third opening 85 provides fluid communication between the pressure-side of gap 64 and a core flow surrounding the turbine flowpath component to allow fluid in the pressure-side of gap 64 to exit the turbine flowpath component on the pressure side through the third opening 85.

Referring to FIGS. 5A and 5B, some aspects of a non-limiting example of a trailing edge portion 84 of airfoil 50 is illustrated. Formed in trailing edge portion 84 in coversheet 62 are a plurality of pedestals 86. In other embodiments, pedestals 86 may be formed in other regions of coversheet 62. Pedestals 86 may be formed by any convenient means, for example but not limited to, material removal means such as chemical or electrochemical machining, the use of freeform manufacturing techniques to form coversheet 62, micromachining and/or electrical discharge machining; or material addition means, such as vapor deposition, selective laser sintering, and/or one or more other freeform fabrication techniques. The shape of pedestals 86 may vary with the needs of the application. Pedestals 86 are configured for attachment to spar 60.

Pedestals 86 extend toward spar 60 from a base 88 to a plateau 90 in contact with spar 60. In one form, pedestals 86 are formed in coversheet 62 in a trailing edge portion of airfoil 50. In other embodiments, pedestals 86 may be formed in other locations of airfoil 50 in addition to or in place of the trailing edge portion of airfoil 50. In addition, in other embodiments, pedestals 86 may be formed completely or partially in spar 60. Pedestals 86 are configured to form therebetween a cooling circuit 92 for the flow of cooling air to cool trailing edge 54. In one form, cooling circuit 92 is operative to discharge cooling air from trailing edge 54 via exit slots 94 formed between adjacent pedestals 86 at trailing edge 54. Cooling circuit 92 is defined between coversheet 62, spar 60 and pedestals 86. Pedestals 86 are bonded at plateau 90 to spar 60, e.g., in the manner set forth above with respect to coversheet 62. By forming pedestals 86 in coversheet 62, the bond interface between coversheet and spar is moved inward into airfoil 50, which places the bond interface at a cooler location in airfoil 50 than had the pedestals been formed on spar 60 and a thin coversheet, e.g., having a thickness 96, been bonded to such pedestals. This placement of the bond interface at a cooler location may increase the life of the bond joint between coversheet 62 and spar 60.

Figure 6A:
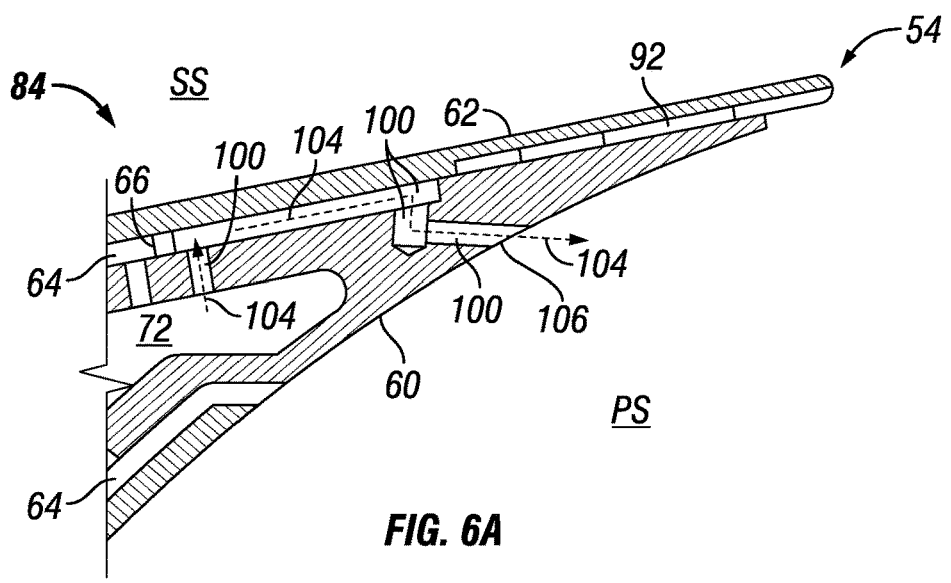
FIGS. 6A and 6B illustrate cross sections depicting some aspects of non-limiting examples of cooling passages in a trailing edge portion of the flowpath component of FIG. 2.
Figure 6B:
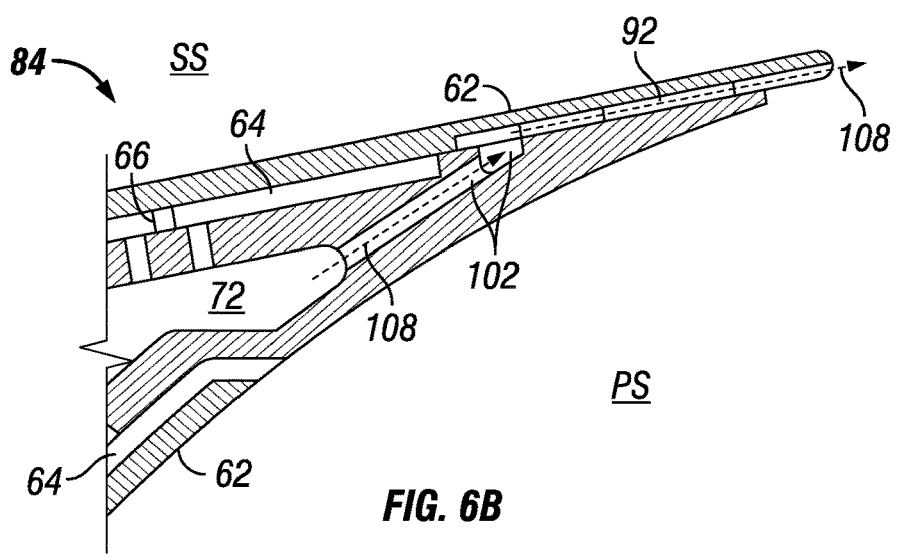
Figure 6C:
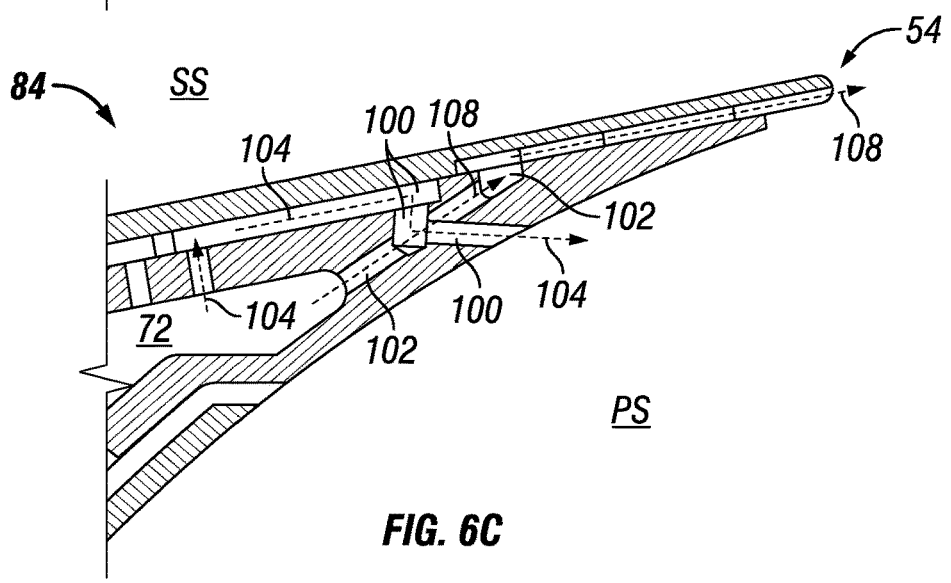
FIG. 6C represents a composite cross section illustrating an overlay of the cooling passages of FIGS. 6A and 6B.

Referring to FIG. 6A-6C, a plurality of internal cooling air passages 100 is interleaved with a plurality of internal cooling air passages 102 along the direction between tip 56 and hub 58 of airfoil 50. That is, as viewed along the direction between tip 56 and hub 58, cooling air passages 100 and cooling air passages 102 are alternatively arranged, e.g., one on top of the other. In one form, cooling air passages 100 and 102 are disposed within spar 60. In other embodiments, cooling air passages may be arranged differently. Cooling air passages 100 and cooling air passages 102 are configured to deliver cooling air for different locations of trailing edge portion 84 of airfoil 50. Cooling air passages 100 and cooling air passages 102 may be formed by any conventional or other means. As illustrated in FIG. 6A, cooling passage 100 penetrates the wall of spar 60 and receives cooling air 104 from supply cavity 72 on suction side SS. Cooling air passage 100 directs cooling air 104 along the inside of coversheet 62 on suction side SS, providing cooling for that portion of coversheet 62. Cooling air passage 100 then transfers cooling air 104 from suction side SS through spar 60 toward pressure side PS to deliver the cooling air via a discharge opening 106 on pressure side PS for film cooling of trailing edge portion 84 of airfoil 50.

As illustrated in FIG. 6B, cooling air passage 102 penetrates the wall of spar 60 and receives cooling air 108 from cavity 72 on pressure side PS, and delivers cooling air 108 to cooling circuit 92 on suction side SS of airfoil 50 for cooling of trailing edge portion 84 of airfoil 50. Cooling air 108 is discharged through exit slots 94 on trailing edge 54 of airfoil 50. As illustrated in FIG. 6C, cooling passages 100 and 102 cross over each other to deliver cooling air to opposite sides of airfoil 50.

Embodiments of the present invention include a turbine flowpath component for a gas turbine engine, comprising: a spar; and a coversheet configured to at least partially enclose the spar, and configured for mating engagement with the spar; wherein the coversheet includes a plurality of pedestals formed therein and extending toward the spar; and wherein the plurality of pedestals are configured to form a cooling circuit for cooling air.

In a refinement, the turbine flowpath component is defined by a pressure side and a suction side; wherein the coversheet is configured for engagement with the spar on the suction side.

In another refinement, the turbine flowpath component further comprises a first plurality of cooling air passages interleaved with a second plurality of cooling air passages, wherein the first plurality of cooling air passages delivers cooling air to a first location; and wherein the second plurality of cooling air passages delivers cooling air to a second location different from the first location.

In yet another refinement, the first plurality of cooling air passages is configured to deliver cooling air to the cooling circuit.

In still another refinement, the turbine flowpath component is defined by a pressure side and a suction side; and wherein the second plurality of cooling air passages is configured to transfer cooling air from the suction side to the pressure side.

In yet still another refinement, the second plurality of cooling air passages are configured to discharge cooling air for film cooling on the pressure side.

In a further refinement, the turbine flowpath component is defined by a pressure side and a suction side, wherein the spar forms a cavity between the pressure side and the suction side, further comprising a plurality of hollow pins extending between the pressure side and the suction side and bridging the cavity, wherein the hollow pins are oval in cross-sectional shape.

In a yet further refinement, the hollow pins are configured to transmit cooling air directly from the suction side to the pressure side.

In a still further refinement, the pedestals are bonded to the spar.

Embodiments of the present invention include a gas turbine engine, comprising: a turbine having a turbine flowpath component, wherein the turbine flowpath component is defined by a first side and a second side opposite the first side; and wherein the turbine flowpath component includes a first plurality of internal cooling air passages and a second plurality of internal cooling air passages, wherein the first plurality of internal cooling air passages is interleaved with the second plurality of internal cooling air passages; wherein the first plurality of internal cooling air passages crosses over the second plurality of internal cooling air passages; wherein the first plurality of internal cooling air passages is configured to deliver cooling air toward the first side; and wherein the second plurality of internal cooling air passages is configured to deliver cooling air toward the second side.

In a refinement, the gas turbine engine further comprises a spar, wherein the first plurality of internal cooling air passages and the second plurality of internal cooling air passages are disposed within the spar.

In another refinement, the spar includes a wall defining a cooling air supply cavity, wherein at least one of the first plurality of internal cooling air passages and the second plurality of internal cooling air passages penetrates the wall and is configured to deliver cooling air from the cooling air supply cavity through the wall to a respective at least one of the first side and the second side.

In yet another refinement, the gas turbine engine further comprises a coversheet configured to at least partially enclose the spar; and a cooling circuit defined between the spar and the coversheet at the first side, wherein the first plurality of internal cooling air passages is configured to supply cooling air to the cooling circuit.

In still another refinement, the coversheet includes a plurality of pedestals formed therein on the first side; wherein the pedestals extend toward the spar and define the cooling circuit between the spar and the coversheet.

In yet still another refinement, the turbine flowpath component has a trailing edge; and wherein the pedestals are disposed adjacent to the trailing edge.

In a further refinement, the coversheet includes an opening on the second side; and wherein the second plurality of internal cooling air passages is configured to supply cooling air to the opening.

In a yet further refinement, the gas turbine engine further comprises a plurality of hollow pins extending between the first side and the second side and bridging the cooling air supply cavity, wherein the hollow pins are oval in cross-sectional shape; and wherein the hollow pins are configured to transmit cooling air directly from the first side to the second side.

In a still further refinement, the turbine flowpath component is configured as a turbine airfoil.

In a yet still further refinement, the turbine flowpath component is configured as a turbine vane.

Embodiments of the present invention include a flowpath component for a gas turbine engine, comprising: a spar defined by a first side, a second side, and a cooling air supply cavity formed between the first side and the second side; and means for cooling the turbine flowpath component using cooling air supplied by the cooling air supply cavity.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbine flowpath component for a gas turbine engine, comprising:
    a spar having a suction-side wall extending from a leading edge to a trailing edge and a pressure-side wall extending from the leading edge to the trailing edge, each wall having an outer surface;
    a coversheet positioned on the spar to at least partially enclose the spar, the coversheet having an exterior surface and an engagement surface opposite the exterior surface, the exterior surface being an outermost surface of the turbine flowpath component, the engagement surface positioned to face the outer surface of the suction-side wall of the spar and the outer surface of the pressure-side wall of the spar, the engagement surface of the coversheet and the outer surface of the suction-side wall of the spar cooperate to define a suction-side gap therebetween, and the engagement surface of the coversheet and the outer surface of the pressure-side wall of the spar cooperate to define a pressure-side gap therebetween;
    a plurality of spacers positioned between the spar and the coversheet in the suction-side gap and in the pressure-side gap; and
    a hollow pin extending between a first opening formed in the outer surface of the suction-side wall and a second opening formed in the outer surface of the pressure-side wall, wherein the hollow pin provides fluid communication between the suction-side gap and the pressure-side gap,
    wherein the turbine flowpath component is defined by a pressure side and a suction side, the coversheet defines at least a portion of a third opening that is located on the pressure side of the turbine flowpath component, and the third opening provides fluid communication between the pressure-side gap and a core flow surrounding the turbine flowpath component to allow fluid in the pressure-side gap to exit the turbine flowpath component on the pressure side through the third opening.

2. The turbine flowpath component of claim 1, wherein the coversheet is configured for engagement with the spar on the suction side.

3. The turbine flowpath component of claim 1, further comprising a first plurality of cooling air passages interleaved with a second plurality of cooling air passages, wherein the first plurality of cooling air passages delivers cooling air to a first location; and wherein the second plurality of cooling air passages delivers cooling air to a second location different from the first location.

4. The turbine flowpath component of claim 3, wherein the first plurality of cooling air passages is configured to deliver cooling air to a cooling circuit defined by the spacers.

5. The turbine flowpath component of claim 3, wherein the second plurality of cooling air passages is configured to transfer cooling air from the suction side to the pressure side of the turbine flowpath component.

6. The turbine flowpath component of claim 5, wherein the second plurality of cooling air passages are configured to discharge cooling air for film cooling on the pressure side.

7. The turbine flowpath component of claim 1, wherein the coversheet includes a plurality of pedestals bonded to the spar.

8. A flowpath component for a gas turbine engine, comprising:
   a spar having a suction-side wall extending from a leading edge to a trailing edge, a pressure-side wall extending from the leading edge to the trailing edge, and a cooling air supply cavity formed between the suction-side wall and the pressure-side wall;
   a coversheet positioned on the spar to at least partially enclose the spar;
   a cooling circuit extending from the trailing edge and formed between the coversheet and the suction-side wall of the spar;
   a first plurality of passages formed in the trailing edge of the spar and extending between the cooling air supply cavity and a first opening formed in the suction-side wall of the spar for providing cooling air to the cooling circuit extending from the trailing edge; and
   a second plurality of passages formed in the trailing edge of the spar, the second plurality of passages extend between the suction-side wall of the spar and the pressure-side wall of the spar for providing cooling air to the trailing edge at a location different from the cooling circuit,
   wherein the second plurality of passages and the first plurality of passages are interleaved along a direction between a tip and a hub of the flowpath component.

9. The turbine flowpath component of claim 7, further comprising a trailing edge portion, wherein the pedestals are formed in the trailing edge portion.

10. The turbine flowpath component of claim 7, wherein the pedestals extend toward the spar from a base to a plateau in contact with the spar.

11. The turbine flowpath component of claim 7, further comprising a trailing edge portion, wherein the pedestals are configured to form a cooling circuit for flow of cooling air to the trailing edge portion.

12. The turbine flowpath component of claim 11, wherein adjacent pedestals at a trailing edge of the trailing edge portion form exit slots therebetween, and wherein the cooling circuit is operative to discharge cooling air from the trailing edge via the exit slots.

13. The turbine flowpath component of claim 1, wherein a cooling circuit is defined between the coversheet, the spar, and the spacers.

14. A turbine flowpath component for a gas turbine engine, comprising:
   a spar including a wall having an outer surface;
   a coversheet positioned on the spar to at least partially enclose the spar, the coversheet having an inner surface configured to partially engage the outer surface of the spar; and
   a plurality of pedestals extending from the inner surface of the coversheet to form a cooling circuit configured to receive cooling fluid, each pedestal having a sidewall that extends from the inner surface to a plateau configured to engage the outer surface of the wall of the spar, wherein the plurality of pedestals are positioned to form (i) a first plurality of passageways extending in a first direction between the inner surface of the coversheet and the outer surface of the spar and (ii) a second plurality of passageways extending for a length in a second direction between the inner surface of the coversheet and the outer surface of the spar;
   wherein the first plurality of passageways intersect the second plurality of passageways to form the cooling circuit,
   wherein the wall of the spar further includes a suction-side wall that extends from a leading edge to a trailing edge and a pressure-side wall that extends from the leading edge to the trailing edge, the suction-side wall and the pressure-side wall cooperate to form a cavity therein, the coversheet extends around the wall of the spar from the trailing edge of the suction-side wall around the leading edge and toward the trailing edge of the pressure-side wall without enclosing a length of the pressure-side wall of the spar, and the plurality of pedestals are located between the suction-side wall of the spar and the coversheet in a trailing edge portion of the spar.

15. The turbine flowpath component of claim 14, wherein adjacent pedestals at the trailing edge form exit slots therebetween that are operative to discharge cooling air from the cooling circuit to the trailing edge.

16. The turbine flowpath component of claim 14, further comprising a plurality of internal cooling air passages formed in the spar and configured to direct cooling air from a cooling air supply cavity of the spar to the cooling circuit.

17. The turbine flowpath component of claim 14, wherein the plurality of pedestals extend toward the spar from a base to a plateau in contact with the spar.

18. The turbine flowpath component of claim 14, wherein the plurality of pedestals extend from the trailing edge along the suction-side wall of the spar.

19. The turbine flowpath component of claim 14, wherein each passageway of the first plurality of passageways does not intersect with any other passageway of the first plurality of passageways and each passageway of the second plurality of passageways does not intersect with other passageways of the second plurality of passageways.

20. The turbine flowpath component of claim 1, wherein each wall of the spar includes an inner surface positioned opposite the outer surface, the inner surface of the suction-side wall and the inner surface of the pressure-side wall cooperating to define a cavity configured to include cooling fluid; and the hollow pin bridges the cavity.

21. The turbine flowpath component of claim 3, wherein the second plurality of cooling air passages are arranged to extend between the coversheet and the suction-side wall of the spar.

* * * * *